(12) United States Patent
Huang

(10) Patent No.: US 7,475,337 B1
(45) Date of Patent: *Jan. 6, 2009

(54) GENERATING STRUCTURED DOCUMENTS BY ASSOCIATING DOCUMENT ELEMENTS IN A FIRST DISPLAY WITH DISPLAYED DOCUMENT TYPE DEFINITIONS IN A SECOND DISPLAY

(75) Inventor: Evan S. Huang, Cupertino, CA (US)

(73) Assignee: XMLCities, Milpits, CA (US)

( * ) Notice: Subject to any disclaimer, the term of this patent is extended or adjusted under 35 U.S.C. 154(b) by 713 days.

This patent is subject to a terminal disclaimer.

(21) Appl. No.: 11/150,658

(22) Filed: Jun. 11, 2005

Related U.S. Application Data

(63) Continuation of application No. 09/754,861, filed on Jan. 5, 2001, now Pat. No. 6,910,182.

(51) Int. Cl.
*G06F 15/00* (2006.01)

(52) U.S. Cl. .................... 715/234; 715/249; 715/760

(58) Field of Classification Search .......... 715/205, 715/234, 236, 249, 760
See application file for complete search history.

(56) References Cited

U.S. PATENT DOCUMENTS

| | | | | |
|---|---|---|---|---|
| 5,974,413 A | * | 10/1999 | Beauregard et al. | 707/6 |
| 6,202,072 B1 | * | 3/2001 | Kuwahara | 715/207 |
| 7,039,859 B1 | * | 5/2006 | Sundaresan | 715/229 |

* cited by examiner

*Primary Examiner*—Cesar B Paula
(74) *Attorney, Agent, or Firm*—Joe Zheng

(57) ABSTRACT

The use of a method/apparatus for generating structured documents is disclosed. A counter is coupled for a product implementing the method/apparatus. When the counter is permitted to increment, the structured documents can be generated from unstructured documents. Identifiers in user-defined document type definitions are used to associate selected objects or group objects in the unstructured documents so that association information of the selected objects or group objects can facilitate the generation of files in a markup language suitable for presentations on various media.

20 Claims, 17 Drawing Sheets

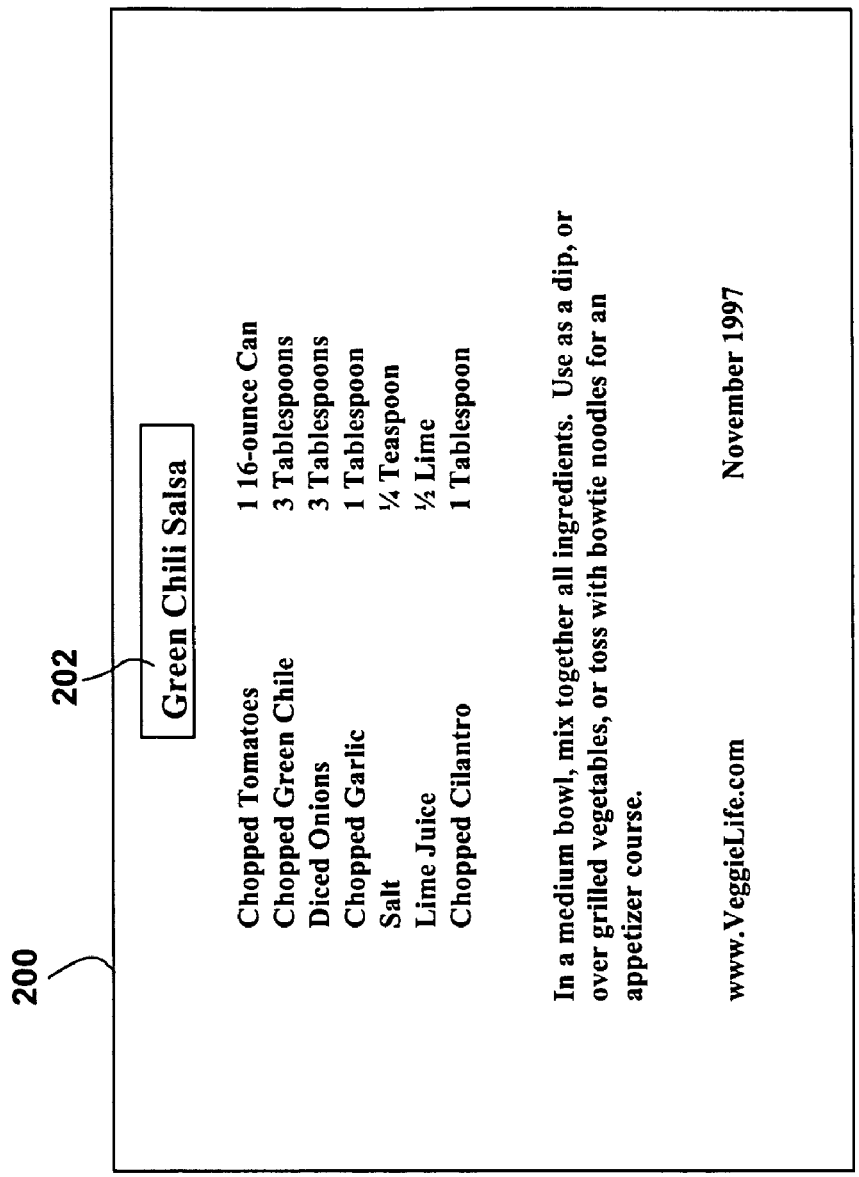

```
<!--......  Document Type Definition (DTD) ...........-->        208
<!-- document element -->
<!ELEMENT document  (recipe+)>

<!--...... recipe element ......-->
<!ELEMENT recipe (ingredient+, procedure+, presentation, originate)>
<!ATTLIST recipe title CDATA #REQUIRED>

<!--...... ingredient element ......-->                          210
<!ELEMENT ingredient (#PCDATA)>
<!ATTLIST ingredient amount CDATA #REQUIRED>

<!--...... procedure element ......-->
<!ELEMENT procedure (#PCDATA)>
<!ATTLIST procedure step CDATA #IMPLIED>

<!--...... presentation element ......-->                        212
<!ELEMENT presentation (#PCDATA)>

<!--...... originate element ......-->
<!ELEMENT originate EMPTY>
<!ATTLIST originate name CDATA #REQUIRED>
<!ATTLIST originate website CDATA #IMPLIED>
<!ATTLIST originate date CDATA #REQUIRED>

<!--...... END of DTD .........-->
```

*Fig. 2B*

```
<document>
<recipe title="Green Chile Salsa">
<ingredient amount="1 16-ounce Can">Chopped Tomatoes</ingredient>
<ingredient amount="3 Tablespoons">Chopped Green Chile</ingredient>
<ingredient amount="3 Tablespoons">Diced Onions</ingredient>
<ingredient amount="1 Tablespoon ">Chopped Garlic</ingredient>
<ingredient amount="1/4 Teaspoon">Salt</ingredient>
<ingredient amount="1/2 Lime">Lime Juice</ingredient>
<ingredient amount="1 Tablespoon">Chopped Cilantro</ingredient>
<procedure>In a medium bowl, mix together all ingredients.</procedure>
<presentation>Use as dip, or over grilled vegetables, or toss with bowtie noodles for an appetizer course.</presentation>
<originate name="VeggieLife" website="www.VeggieLife.com" date="November 1997" />
</recipe>
</document>
```

*Fig. 2C*

```
<?xml version="1.0"?>
<xsl:stylesheet xmlns:xsl="http://www.w3.org/TR/WD-xsl">
  <xsl:template match="/" >
    <html>
      <body>
        <xsl:apply-templates />
      </body>
    </html>
  </xsl:template>

<xsl:template match="document">
    <xsl:apply-templates />
  </xsl:template>

<xsl:template match="recipe">
    <h2><center><font color="teal">Title: </font><font color="red">
      <xsl:value-of select="title"/>
    </font></center></h2>
    <h3><center><font color="teal">From: </font><font color="gray">
      <xsl:for-each select="originate" >
      <xsl:value-of select="@name" />
      </xsl:for-each>
    </font></center></h3>
    <p><center><table bgcolor="ffffc0" cellspacing="12"><tr><td>
      <xsl:for-each select="image">
      <IMG SRC="recipe.jpg" HEIGHT="200" WIDTH="220"/></xsl:for-each></td><td><table>
       <tr><td><font color="teal" size="5">Ingredient:</font></td></tr>
       <xsl:for-each select="ingredient">
         <tr><td><xsl:value-of select="text()" /></td>
         <td><font color="blue"><xsl:value-of select="amount"/></font></td></tr>
       </xsl:for-each>
    </table></td></tr></table></center></p>

<p><center><table><tr><td><font color="teal" size="5">Procedure:</font></td></tr>
      <xsl:for-each select="procedure">
        <tr><td><xsl:value-of selec="text()" /> </td></tr>
      </xsl:for-each>
                <tr><td></td></tr>
      <tr><td><font color="teal" size="5">Presentation:</font></td></tr>
      <xsl:for-each select="presentation">
        <tr><td><xsl:value-of selec="text()" /> </td></tr>
      </xsl:for-each>
    </table></center></p>

<p><center><table bgcolor="c0ffff" width="80%">
       <xsl:for-each select="originate">
         <tr><td align="left"><xsl:value-of select="website" /></td>
         <td align="right"><xsl:value-of select="date"/></td></tr>
       </xsl:for-each>
    </table></center></p>
  </xsl:template>
</xsl:stylesheet>
```

| Document Element | Element Attribute | Font Type | Font Style | Font Color | Font Size | Font Effect |
|---|---|---|---|---|---|---|
| recipe | title | Courier New | Bold | Black (0x000000) | 12 | Underline |
| ingredient | | Courier New | Normal | Magenta (0xFF00FF) | 10 | Normal |
| ingredient | amount | Courier New | Italic | Red (0x0000FF) | 10 | Normal |
| procedure | | Arial | Italic | Blue (0xFF0000) | 10 | Normal |
| presentation | | Arial | Normal | Cyan (0xFFFF00) | 10 | Normal |
| originate | name | Times New Roman | Bold | Green (0x00FF00) | 10 | Normal |
| originate | website | Times New Roman | Bold + Italic | Yellow (0x00FFFF) | 10 | Normal |
| originate | date | Times New Roman | Normal | Gray (0x808080) | 10 | Normal |

```
<document>
<font font_ID="1" type="Courier New" style="Bold" color="0x000000" size="12" effect="Underline" />
<font font_ID="2" type="Courier New" style="Normal" color="0xFF00FF" size="10" effect="Normal" />
<font font_ID="3" type="Courier New" style="Italic" color="0x0000FF" size="10" effect="Normal" />
<font font_ID="4" type="Arial" style="Italic" color="0xFF0000" size="10" effect="Normal" />
<font font_ID="5" type="Arial" style="Normal" color="0xFFFFF00" size="10" effect="Normal" />
<font font_ID="6" type="Times New Roman" style="Bold" color="0x00FF00" size="10" effect="Normal" />
<font font_ID="7" type="Times New Roman" style="Bold Italic" color="0x00FFFF" size="10" effect="Normal" />
<font font_ID="8" type="Times New Roman" style="Normal" color="0x808080" size="10" effect="Normal" />
```
⎯ 802

```
<data font_ID="1">Green Chili Salsa</data>
<data font_ID="2">Chopped Tomatoes</data>
<data font_ID="3">1 16-ounce Can</data>
<data font_ID="2">Chopped Green Chile</data>
<data font_ID="3">3 Tablespoons</data>
<data font_ID="2">Diced Onions</data>
<data font_ID="3">3 Tablespoons</data>
<data font_ID="2">Chopped Garlic</data>
<data font_ID="3">1 Tablespoon</data>
<data font_ID="2">Salt</data>
<data font_ID="3">¼ Teaspoon</data>
<data font_ID="2">Lime Juice</data>
<data font_ID="3">½ Lime</data>
<data font_ID="2">Chopped Cilantro</data>
<data font_ID="3">1 Tablespoon</data>
<data font_ID="4">In a medium bowl, mix together all ingredients.</data>
<data font_ID="5">Use as a dip, or over grilled vegetables, or toss with bowtie noodles for an appetizer course.</data>
<data font_ID="6">www.</data>
<data font_ID="7">VeggieLife</data>
<data font_ID="6">.com</data>
<data font_ID="8">November 1997</data>
```
⎯ 804

`</document>`

```
<?xml version="1.0" standalone="yes"?>
<xsl:stylesheet xmlns:xsl="http://www.w3.org/1999/XSL/Transform" version="1.0">
<xsl:template match="/">
<document>
<xsl:apply-templates/>
</document>
</xsl:template>
<xsl:template match="document">
<recipe title="{data[@font_ID='1']}">
<xsl:for-each select="data[@font_ID='2']">
<ingredient amount="{following-sibling::data[@font_ID='3']}">
<xsl:value-of select="."/>
</ingredient>
</xsl:for-each>
<xsl:for-each select="data[@font_ID='4']">
<procedure step="{position()}">
<xsl:value-of select="."/>
</procedure>
</xsl:for-each>
<presentation>
<xsl:value-of select="data[@font_ID='5']"/>
</presentation>
<xsl:for-each select="data[@font_ID='7']">
<originate name="{.}" website="{preceding-sibling::data[@font_ID='6']}{.}{following-sibling::data[attribute::font_ID='6']}" date="{following-sibling::data[@font_ID='8']}" />
</xsl:for-each>
</recipe>
</xsl:template>
</xsl:stylesheet>
```

GENERATING STRUCTURED DOCUMENTS BY ASSOCIATING DOCUMENT ELEMENTS IN A FIRST DISPLAY WITH DISPLAYED DOCUMENT TYPE DEFINITIONS IN A SECOND DISPLAY

CROSS-REFERENCE TO RELATED APPLICATION

This application is a continuation of pending U.S. application Ser. No. 09/754,861, now, U.S. Pat. No. 6,910,182, issued on Jun. 21, 2005.

BACKGROUND OF THE INVENTION

1. Field of the Invention

The present invention generally relates to the area of document processing and electronic publishing systems and more particularly relates to a method and apparatus for generating structured documents with user-defined document type definitions. The present invention also relates to a mechanism provided to users to convert unstructured documents for various presentations using the method and apparatus, wherein the unstructured documents are defined to be files composed, edited, or managed via an authoring application (e.g. word processing).

2. Description of the Related Art

The Internet is a rapidly growing communication network of interconnected computers around the world. Together, these millions of connected computers form a vast repository of hyperlinked information that is readily accessible by any of the connected computers from anywhere and anytime. With millions of web pages being created and added to this vast repository each year, there is a tremendous need to quickly and easily convert documents, such as presentations, data sheets or brochures, into a format presentable to and accessible by other applications or computers on the Internet.

It is well known that a preferable format that is presentable to a web browsing application (e.g. a browser) is in a markup language, such as HyperText Markup Language (HTML), Extensible Markup Language (XML), Standard Generalized Markup Language (SGML) or Wireless Markup Language (WML). Files or documents that are so composed, edited or managed for web browsing applications are commonly referred to as structured files or documents. Among all the benefits of the structured documents, the ability to provide user-defined document type definitions (DTD) or document schema definition opens a new paradigm for information exchange or storage. However, the challenge is how to generate structured documents with arbitrarily user-defined DTD.

An unstructured document with specific DTD can either be created from an unstructured document or converted from a structured document with other type of DTD. There are several editors for generating structure documents. The exemplary editors include Adobe FrameMaker, Arbortext Epic, and SoftQuad XMetal. These editors usually provide a structural view along with a word processing view, where the word processing view is like the traditional word processing environment for unstructured document while the structural view contains the document structure of data elements defined in certain DTD. To create a structured document from scratch in these editors, a user usually needs to create an unstructured document in the word processing view. With a desired DTD loaded in, the user constructs a document structure tree in the structural view in accordance with document elements defined in the DTD. Typically, the user is engaged in procedures by copying-and-pasting or dragging-and-dropping the data elements from the created document into the document structure tree.

To convert a structured document with one DTD into another DTD in these editors, one needs to load in the structured document, to modify the tags and attributes of document elements from one DTD to another, and to shuffle the data elements or to parse new data elements associated with redefined document elements in the new DTD.

Among the procedures described above, the association between data elements and document elements is a crucial and effortful processing for creating or converting an unstructured or structured document into a structured document with specific DTD. Several approaches have been proposed to associate the data elements and the document elements to simplify the generation of the structured document. For examples, a keyword extracting approach extracts a keyword representative of the document structure from an unstructured document and the keyword/text pairs are used as the association between document elements and data elements. A coordinate approach associates data elements with markup language tags in document elements by sorting the coordinates for coordinate documents. A logical structure approach analyzes the document structure by matching the predetermined patterns and parses the data elements based on the analyzed document elements. Nevertheless, none of the above approaches have considered using identifiers (e.g. font information) to associate the data elements and document elements. There is, therefore, a need for a generic approach to use the identifier information in user-defined document type definitions to associate data elements and document elements for generating structured documents.

In addition, the procedures required by the exemplary editors are somehow tedious and laborious and can be inherently of high cost. Quite often, a business that has many documents to convert has to outsource the process due to the inefficiency and slowness associated with the conversion process. On the other end, the conversion process conducted by a service provider is difficult to be quantified as it is mainly involved in manual and repeated processes depending on the complexities of the documents. There is thus another need for a mechanism for quantifying the conversion of the unstructured documents to structured documents for various presentations in a cost-determinable way.

SUMMARY OF THE INVENTION

The present invention has been made in consideration of the above described problems and needs and has particular applications to presentations over the Internet. One of the features in the present invention is the use of identifiers in a DTD file to associate selected objects or group objects so that association information of selected objects or group objects can facilitate the generation of files in a markup language suitable for presentations on various media.

The present invention may be implemented as a method, a system, a product or other practical forms. According to one implementation, the present invention is a method. The method receives a definition file including document type definitions (DTD) and displays a metafile along with the definition file, the metafile including a number of displayable objects and respective decoration attributes about each of the displayable objects. The definition file includes a structure for document elements, each corresponding to one of the displayable objects in the metafile. Some of the document elements include a number of identifiers, each of the identifiers being assigned to one of the document elements. In one implementation, the identifiers are numerals and/or alphabets. In another implementation, the identifiers are one or more of a font name, a color name, a size, a font type, a color, a style, various effects or other symbols. The method associates at least one of the identifiers with one of the displayable objects.

According to another implementation, the present invention is implemented as a method for providing document conversion process, the method comprising activating a counter having a numbering system, converting an unstructured document into a metafile, wherein the metafile including a number of displayable objects and respective decoration attributes about each of the displayable objects, receiving a definition file including document type definitions (DTD) relating to the unstructured document; generating a modified metafile including association information of at least one of the displayable objects associated with one of the definitions in the definition file; and causing the counter to increment as soon as the modified metafile is to be saved.

Objects and advantage together with the foregoing are attained in the exercise of the invention in the following description and resulting in the embodiments illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2A illustrates an example of an unstructured document that may be composed, edited or managed by an authoring tool.

FIG. 2B is an example of document type definitions (DTD);

FIG. 2C shows a structured document for the unstructured document shown in FIG. 2A based on the document type definitions (DTD) in FIG. 2B;

FIG. 3C shows an example of a style sheet designed in XML format with respect to displayable objects in a metafile shown in FIG. 3B;

FIG. 5 is an association table for document elements defined in DTD in FIG. 2B and font attributes;

FIG. 8 is an intermediate structured document, which contains parsed data elements with assigned font IDs associated with a list of font document elements;

FIG. 10 shows an implementation of the transformation process in FIG. 9 using the extensible style language for transformation (XSLT).

DETAILED DESCRIPTION OF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description is presented largely in terms of procedures, logic blocks, processing, and other symbolic representations that directly or indirectly resemble the operations of data processing devices coupled to networks. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1A:
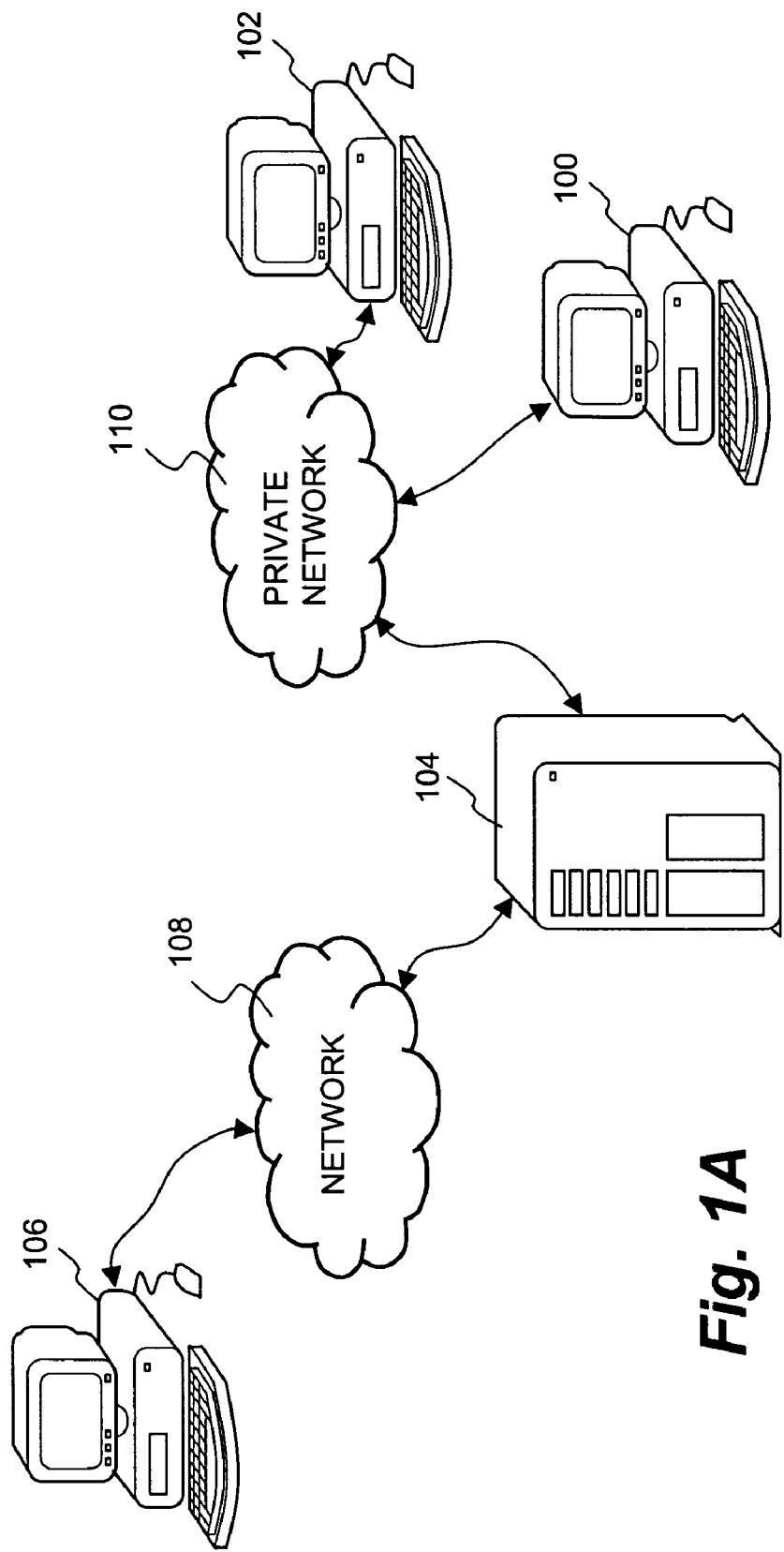
FIG. 1A shows a basic system configuration in which the present invention may be implemented in accordance with a preferred embodiment.

Referring now to the drawings, in which like numerals refer to like parts throughout the several views. FIG. 1A shows a basic system configuration in which the present invention may be implemented in accordance with a preferred embodiment. Unstructured documents, such as product descriptions, functions lists and price schedules, may be created using an authoring tool executed on a computer 100. Files or Documents created by an authoring tool are referred to as unstructured documents. Exemplary authoring tools may include Microsoft Office (e.g. Microsoft Word, Microsoft PowerPoint, and Microsoft Excel), Adobe FrameMaker and Adobe Photoshop. The unstructured documents may be uploaded to computing device 102 that may serve as a central repository. Computing device 102 may be a server station from Sun Microsystems (www.sun.com) or a desktop computer loaded with a complied and linked version of one embodiment implementing the present invention.

In one setting, computer 100 and computing device 102 are inseparable and perform document conversion process and generate structured documents that may be ultimately represented in a format of markup language such as XML or HTML. In one application, the structured documents represented in XML are converted to HTML format and become available through a private network 110 to a service server 104 that hosts what is generally referred to as a www (world wide web) site.

In one situation, a user uses a desk computer 106 that operates a browsing application and is coupled to data network 108 to access files on service server 104. These files represented by the structured documents in computer 102 may represent the latest product information originally composed via an authoring tool.

As will be explained below, the present invention is not limited to the Internet applications. It may be practiced in individual computers in which users often create documents in different word processing formats, such as FrameMaker or Microsoft Word. The present invention may be utilized to convert documents to a markup representation regardless of the exact word processing formats.

Figure 1B:
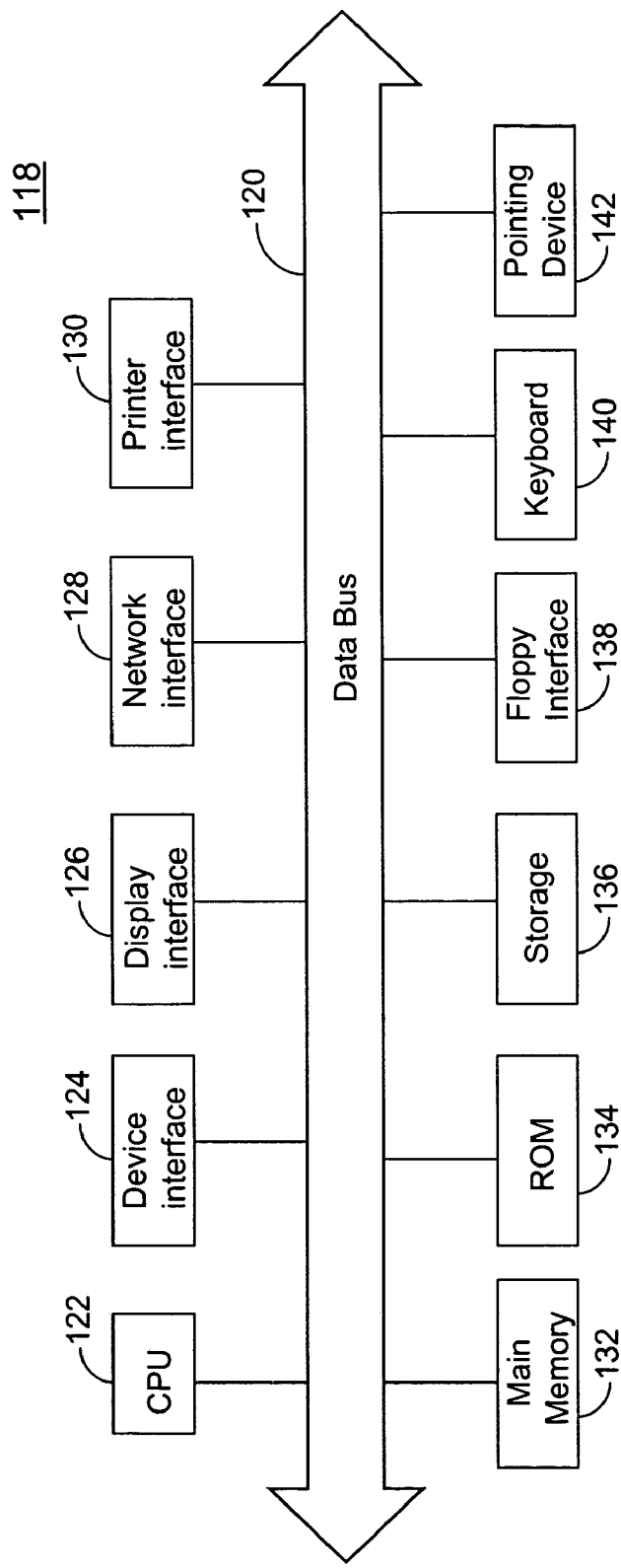
FIG. 1B shows internal construction blocks of a system in which the present invention may be implemented and executed to achieve desired results contemplated in the present invention.

FIG. 1B shows an internal construction blocks of a system 118 in which the present invention may be implemented and executed. System 118 may correspond to a client device (e.g. computer 100, 102 or 106) or a server device (e.g. server 104). As shown in FIG. 1B, system 108 includes a central processing unit (CPU) 122 interfaced to a data bus 120 and a device interface 124. CPU 122 executes certain instructions to manage all devices and interfaces coupled to data bus 120 for synchronized operations and device interface 124 may be coupled to an external device such as computer 102 hence documents therefrom are received into memory or storage through data bus 120. Also interfaced to data bus 120 is display interface 126, network interface 128, printer interface 130 and floppy disk drive interface 138. Generally, a compiled and linked version of one embodiment of the present invention is loaded into storage 136 through floppy disk drive interface 138, network interface 128, device interface 124 or other interfaces coupled to data bus 120.

Main memory 132 such as random access memory (RAM) is also interfaced to data bus 120 to provide CPU 122 with the instructions and access to memory storage 136 for data and other instructions. In particular, when executing stored application program instructions, such as the complied and linked version of the present invention, CPU 122 is caused to manipulate the data to achieve results contemplated by the present invention. ROM (read only memory) 134 is provided for storing invariant instruction sequences such as a basic input/output operation system (BIOS) for operation of keyboard 140, display 126 and pointing device 142 if there are any.

FIG. 2A illustrates an example of an unstructured document 200 that may be composed, edited or managed by an authoring tool. In an unstructured document, data is generally presented in sequence, which usually follows a reading order (e.g. from top to bottom and left to right). This sequence may be parsed into segments of data elements, where each data element (e.g., referenced by 202) is assigned with decoration attributes or information such as positions, font color, font size, font type, style and various effects and etc. The decoration information is essentially for proper layout and presentation purpose when a file containing the data elements is opened by the authoring tool for display on a display screen.

According to one embodiment, an unstructured document is printed to a metafile format that contain the decoration information. An example of a metafile format is commonly used Portable Data Format (PDF). One of the advantages of the metafile format is its independence from the authoring tool and perhaps from computers so that the metafile format can be opened or read identically in many different environments.

A structured document such as SGML and XML starts with document type definitions (DTD). FIG. 2B illustrates an example of DTD 208 for "recipe-type" documents, in which a document is to be broken down into structures of document elements. A particular document element 210 may contain other document elements and attributes. Another example of the document element 212 contains only the parsed character data.

FIG. 2C shows structured document 220 converted correspondingly from unstructured document 200 in FIG. 2A with respect to DTD 208 in FIG. 2B. As shown in the figure, the data sequence in the unstructured document is parsed into data elements associated with document elements defined in DTD for the structured document.

Unlike the unstructured document, the structured document can easily access certain information via the document elements. Presentation of a structured document is usually defined in separate style sheets, e.g., written in cascading style sheet (CSS) or extensible style language for formatting objects (XSL-FO), which interprets layout for each document element. This feature allows a structured document to be presented in different layouts for different media through different style sheets. Generally, the decoration information or formatting attributes, such as font information in an unstructured document, unless defined in DTD as attributes of document elements, are abandoned after an unstructured document is converted into a corresponding structured document. Further modification of formatting information will in general not affect the converted structured documents.

Figure 3A:
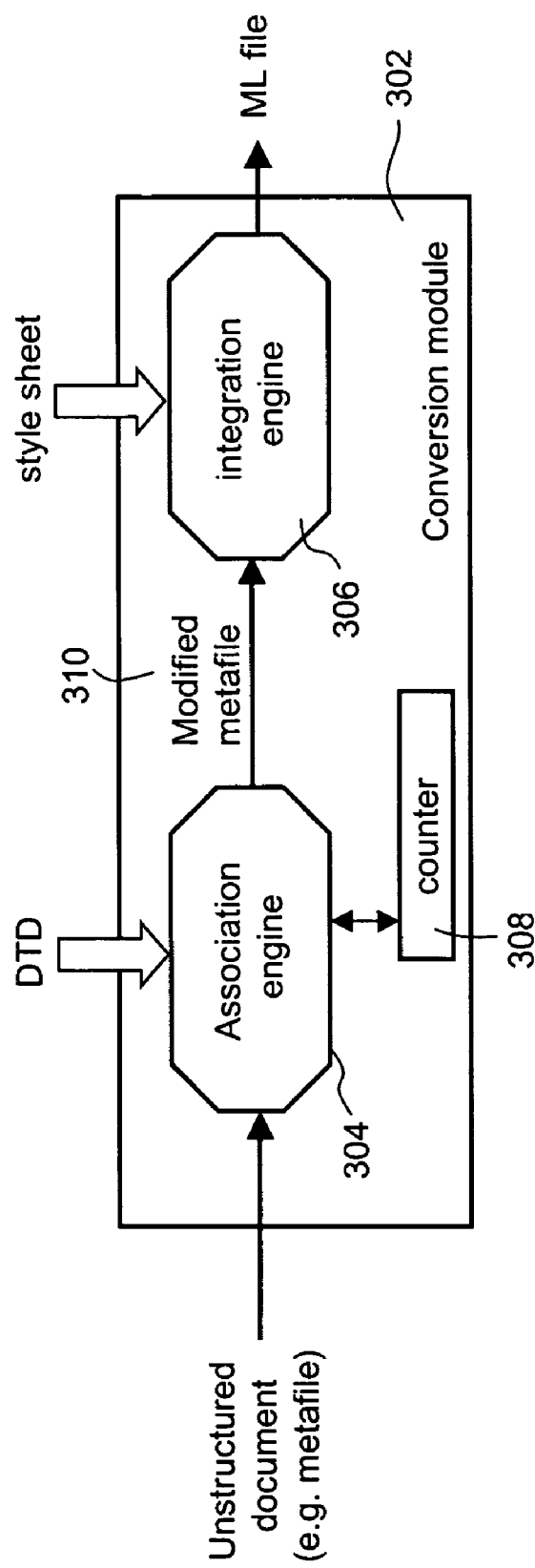
FIG. 3A illustrates a functional diagram according to one embodiment of the present invention.

FIG. 3A illustrates a functional diagram 300 according to one embodiment of the present invention. A conversion module 302 comprises an association module 304 and an integration module 306. Association module 304 receives an unstructured document, preferably in a metafile format. At the same time, association module 304 also receives a file, referred to as a definition file, including DTD that are predefined. Generally, DTD is defined according to the nature or purposes of the unstructured document. For example, the unstructured document is in a category of receipts, e.g. document 200 in FIG. 2A, the DTD in a definition file as shown in FIG. 2B is designed in accordance to the "receipt-type" documents.

Figure 3B:
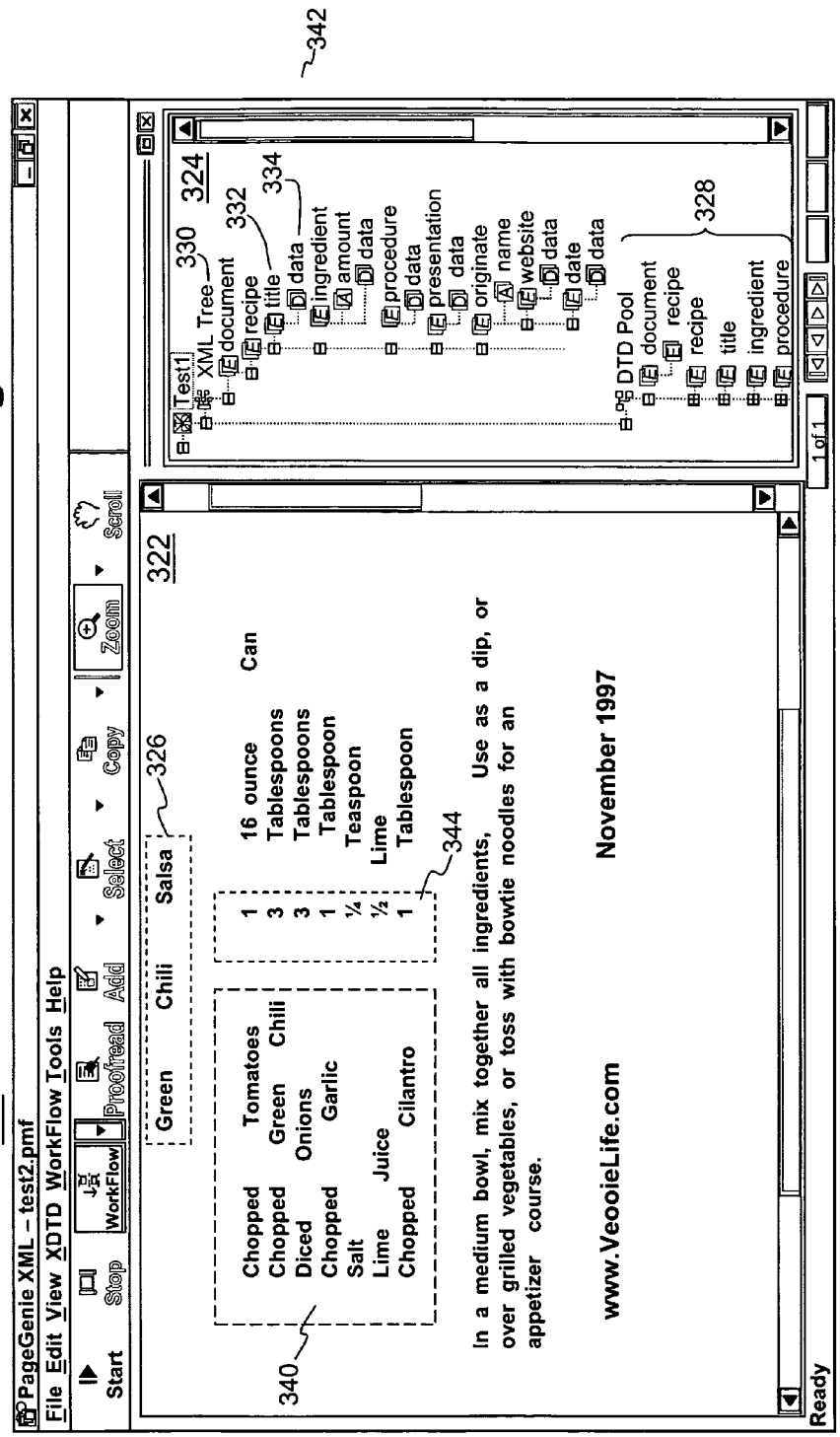
FIG. 3B shows a visual environment implementing a conversion module according to one embodiment of the present invention.

To further understand association module 304, FIG. 3B shows an environment 320 implementing conversion module 302 according to one embodiment of the present invention. Environment 320 includes two displays 322 and 324 for a user to perform a conversion of an unstructured document to a file in markup language (referring to a markup language file). Display 322 is used to display the unstructured document. In one preferable embodiment, a metafile version of the unstructured document is loaded for display. A metafile, referring to either the unstructured document or a printed version thereof, typically contains many displayable objects. Each object is a cluster or a group of characters or words or a graphic representation. As shown in display 322, each word or an isolated numeral is a displayable object which is inherently carried over in the metafile. In other words, each object is defined by a number of attributes or decoration information including, but not limited to, type, size, color and position of the object such that it can be "printed" correctly. A number of objects can be grouped manually by a user in terms of their meanings or purposes. For example, group object 326 includes three character-type objects "Green", "Chili" and "Salsa". Naturally the three character-type objects forms a title as a group object 326. The object grouping may be performed for the rest of the displayed metafile in display 322.

Display 324 is used to display a definition file prepared for the metafile in display 322. To facilitate operations of association module 304, the definition file is presented graphically as "DTD Pool" 328. For example, the graphical representation 328 of DTD 208 in FIG. 2B is used in display 324 to illustrate the hierarchical relationships among the document elements.

Accordingly to one embodiment that ultimately converts the metafile to an XML file, an auxiliary XML tree 330 is produced from "DTD Pool" 328. Auxiliary XML tree 330 also shows the hierarchical relationships among the document elements. In addition, each of the document elements is assigned to an identifier that may include, but not be limited to, a numeral, a name, a font, a type name or a color. In one embodiment, the identifier is in "data" of each of the document elements. To associate group object 326 with a document element "title" 332, "data" 334 is activated upon group object 326 is selected. One of the features in the present invention is an underlying association that relates group object 326 with the identifier in "data" 334. Specifically in one embodiment, if the identifier in "data" 334 is a color, "green", group object 326 is highlighted in green to indicate that this group object has been associated with the DTD. If the identifier is a font, "Arial", group object 326 is highlighted in style Arial to indicate that this group object has been associated with the DTD.

Similarly, a group object 340 can be associated with an identifier in data 342 under "ingredient", a group object 344 can be associated with an identifier in data 346 under "amount" of "ingredient" and so on. As a result, the metafile in display 322 has been segmented and the displayable objects therein are respectively grouped and each of the group objects is associated with the document element in the loaded DTD by an identifier. Display 322 now has a modified metafile 310, an example of which will be illustrated below.

Referring now back to FIG. 3A, modified metafile 310 is input to an integration module 306 that further receives a style sheet. A style sheet is typically configured to include mapping rules in accordance of the media on which the objects from the metafile will be presented. One exemplary media is a web presentation of a file accessible by a browser (e.g. Internet Explore from Microsoft). Hence, the file is in markup language, such as HTML or XML, referring to as a markup language file.

FIG. 3C shows an example of such style sheet designed in XML format with respect to the displayable objects in the metafile. Generally a style sheet is designed to position, color or size respectively each of the objects so that a proper and attentive presentation can be achieved for a particular media. The example in FIG. 3C is designed for presenting "receipt-type" document and causes the modified metafile to generate a proper XML file when loaded. In other words, integration module 306 generates the XML file from the modified metafile in accordance with the style sheet. Given the description herein, it can be noted that a style sheet does not have to be input to integration module 306. In one implementation, the mapping rules can be loaded in with the DTD file so that integration module 306 performs mapping from the modified metafile to a markup language file in accordance with the loaded mapping rules.

Figure 3D:
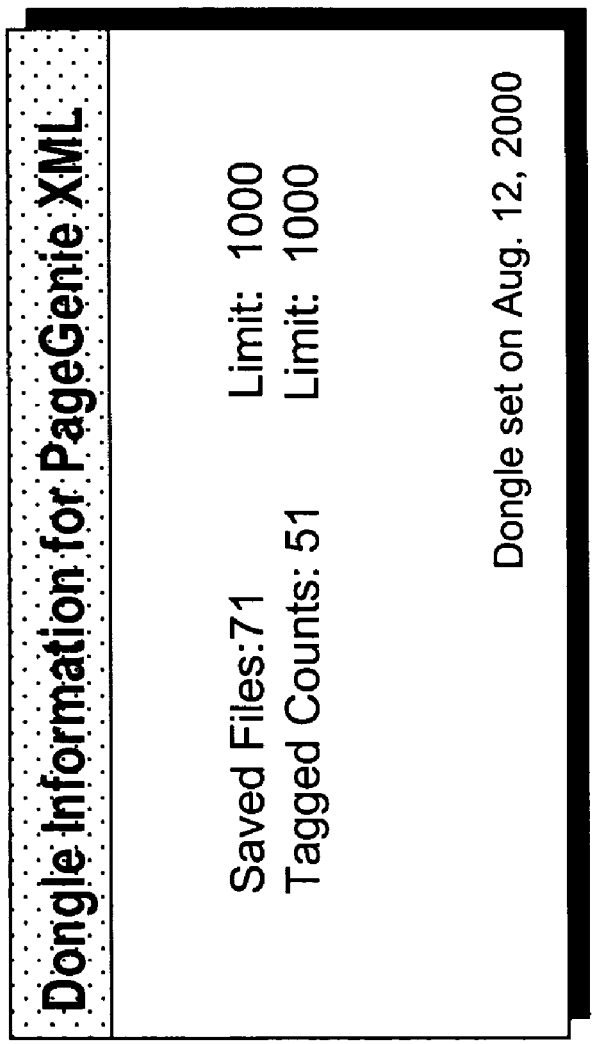
FIG. 3D shows an exemplary message from a dongle.

According to one embodiment, conversion module 302 is implemented in software and may be distributed as an application to users or service providers. It is understood that the conversion process from an unstructured document to a markup language file is difficult to be quantified in a cost-determinable way. A counter 308 is included in conversion module 302. In one embodiment, counter 308 is configured to count the number of pages in the metafile to be converted. Every time, all of the objects in a display (i.e. a page display) are associated with the document elements in a DTD file and saved as a corresponding modified metafile, counter 308 increments. FIG. 3D shows an example of counting results kept in a dongle. A dongle (pronounced DONG-uhl) is a mechanism for ensuring that only authorized users can copy or use a specific software application, especially very expensive programs. Common implementations of a dongle include a hardware key that plugs into a parallel or serial port on a computer and that a software application accesses for verification before continuing to run; special key diskettes accessed in a similar manner; and registration numbers that are loaded into some form of read-only memory at the factory or during a system setup.

When the dongle needs to be reset, the conversion process can be evaluated in a cost-determinable way. According to one embodiment, an owner of a product including an implementation of conversion module 302 may distribute the product free or at very low cost to users. Typically the user needs to produce volumes of web pages from the unstructured documents composed, edited or managed by various authoring tools. One of the benefits for the user to receive the product in such manner is not to have to come up with a large capital for acquiring the product before using it. The users may pay for the usage of the products. Hence, one of the purposes of using a dongle with conversion module 302 is to manage the usage thereof. As a result, the owner of the product can control the usage of the product by controlling the dongle containing the usage information.

Figure 3E:
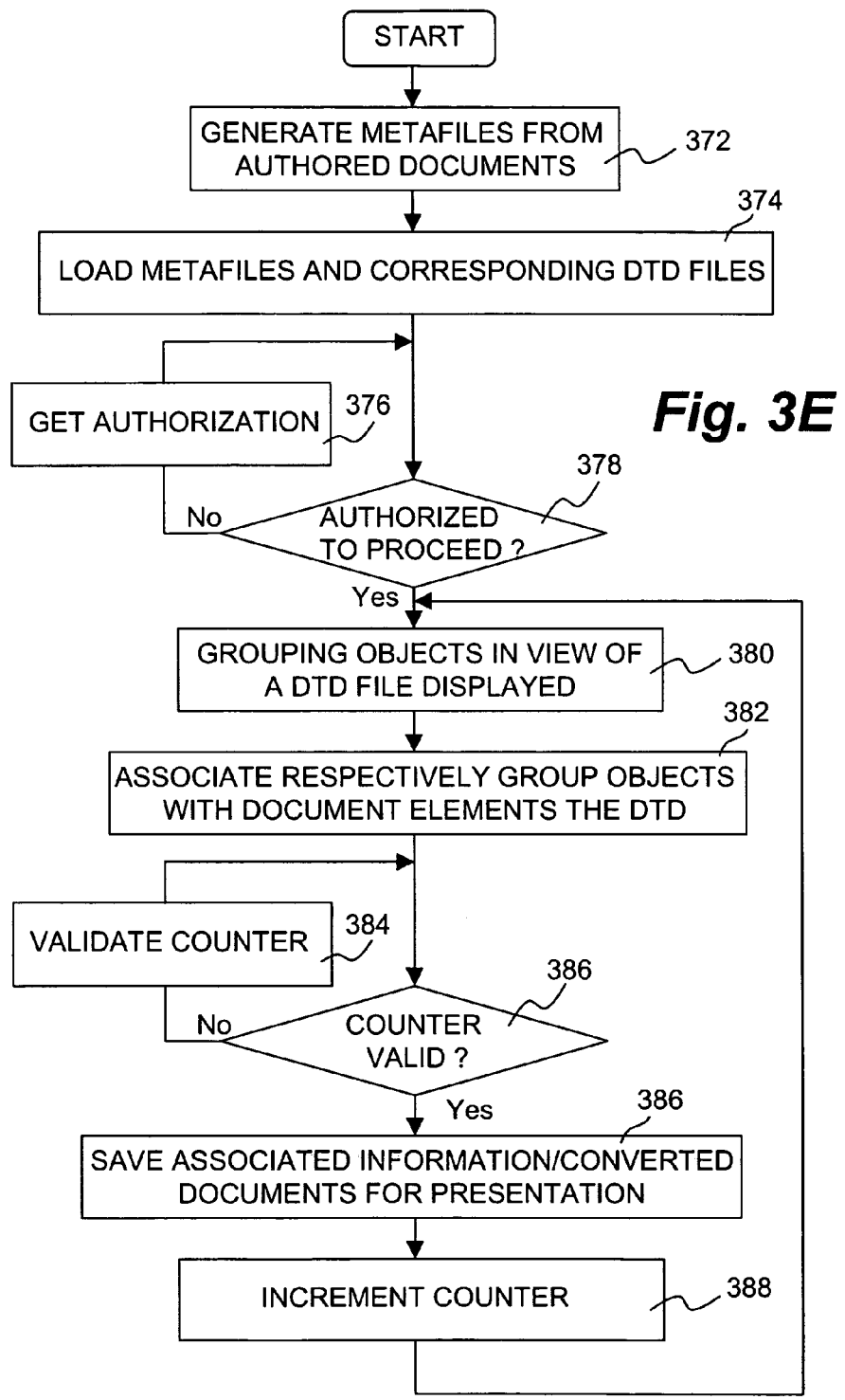
FIG. 3E shows a process flowchart of using a product including an implementation of conversion module according to one embodiment of the present invention.

FIG. 3E shows a process flowchart 370 of using a product including an implementation of conversion module 302 according to one embodiment of the present invention. Sometimes, the product is leased by a user or a business. Other times, the product is used by a service provider providing services to businesses that need to convert unstructured documents to structured documents for different media presentation (e.g. presentation on a web site).

Process 370 starts with generating metafiles from authored documents at 372. Generally, the authored documents may have been prepared using one or more authoring tools. As described above, metafiles are preferably obtained from the authored documents so that conversion module 302 does not have to be respectively configured for each of the different authoring tools. However, it should be noted that the preference of a metafile is not an inherent limitation to the current invention but is to make the product or conversion module 302 work more efficiently. Those skilled in the art understand that a conversion interface or a print driver could be configured to accommodate any type of the authored documents or generate the metafiles.

Once the metafiles are obtained, they may be now loaded to a visual environment in which the metafiles can be respectively displayed. Environment 320 of FIG. 3B may be applicable so that pages of each of the metafiles can be individually loaded for display.

Before process 370 permits a user to proceed further, an authorization process 378 is triggered to ensure that the user is operating an authorized product. As described above, one exemplary authorization method is through a dongle that is pre-set by a business or a dealer that offers/owns/controls the product. If authorization process 378 indicates that process 370 is not authorized, typically a display is shown to the user as to where the product can be authorized. One of the procedures in setting authorization 376 involves a purchase of a permitted quantity for the number of pages converted or saved.

According to one embodiment, a dongle is used for coupling to a computer executing process 370. The dongle includes a first and a second number. The first number is a starting number, for example, "10", and the second number is a limit number, for example, "1000", which means there are 1000 pages of converted documents can be processed and saved by process 370.

Once process 370 is permitted to proceed to 380, the user is now permitted to group a number of displayable objects respectively to group objects according to, perhaps, their meanings or their purposes and in view of a DTD file loaded and display nearby. At 382, the group objects can be respectively associated with definitions in the DTD. At least some of the definitions have a number of identifiers, preferably each identifier is associated or designated to one of the definitions.

As described above, the associations between the selected objects and the definitions are to be saved in a modified metafile. Before process 370 permits such saving, an counter is to be checked at 386. In one embodiment, the first and the second numbers in dongle are compared. When the first number is substantially close to the second number, for example the two numbers being the same, process 370 will ask for a replenishment of the permitted usage. Typically, the user has to get the dongle reset or reconfigured by a business or a dealer that can now collect fees based on the information in the dongle. At 384, the numbers have been reset and now permit process 370 to proceed.

At 386, a save step can be conducted. Depending on an exact implementation, the modified metafile or a markup language file can be saved in a storage space. The markup language file is generated from the modified metafile in reference to a style sheet for a predefined media presentation. At 388, the counter is incremented.

If should be noted that the counter is checked at 386, in particular after 384, in FIG. 3E. In fact, the description has made it evident to those skilled in the art that the counter could be checked or consulted virtually anywhere along process 370. One of the objectives for using a counter herein is to facilitate a business to control and determine the usage of process 370 so that a cost could be determined and a fee could be charged.

Figure 4:
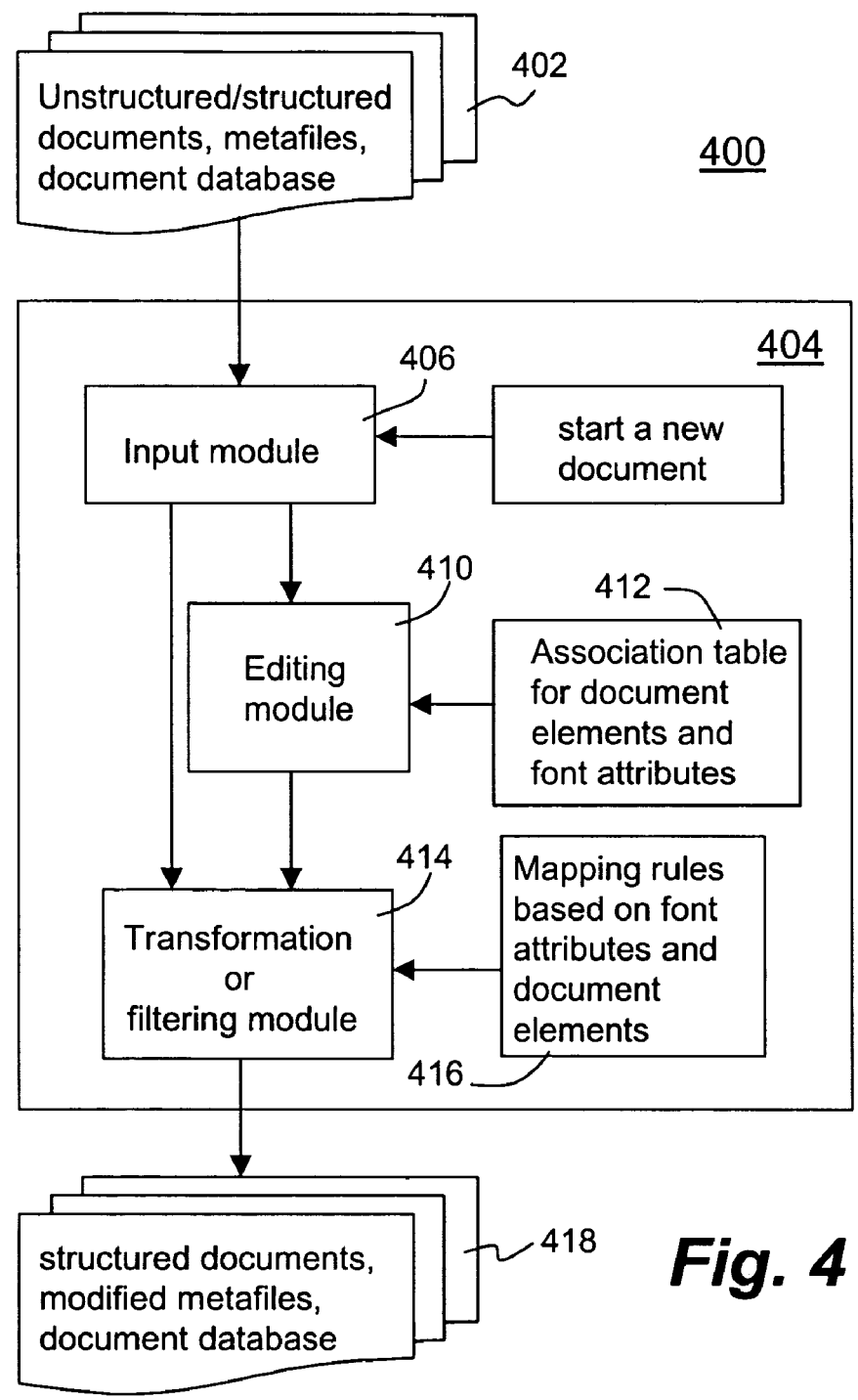
FIG. 4 illustrates a block diagram of data processing apparatus which imports, edits, and converts unstructured or structured document into structured documents with user-defined DTD using structure-based font information.

FIG. 4 shows a functional block diagram 400 of a data processing module 404 according to one embodiment of the present invention. Data processing module 404 included in integration module 306 comprises an input module 406, an editing module 410 and a transformation or filtering module 414. One of the functions performed by data processing module 404 is to convert unstructured documents or structured documents with different DTD into corresponding structured documents with pre-defined or specific DTD.

Input module 406 loads documents or imports documents from a document database 402 that may correspond to a repository in computing device 102 of FIG. 1A. Alternatively input module 406 can start a new document 408. It should be noted that the loaded or imported documents, can be either unstructured (e.g. a metafile) or structured and may have contained pre-created structure-based font information in certain cases.

An editing module 410 communicates with input module 406 and creates/edits the structure-based font information for the input documents. This module allows selections of data elements for the input documents and provides an editing environment to alter the font attributes such as font type, font style, font color, font size, and font effects for the selected data elements. The way to parse the input documents into data elements and to assign font attributes is based on an association table for the document elements defined in a desired DTD and associated font attributes 412. An exemplary association table 500 for DTD 412 is given in FIG. 5, which contains fields of document element 502, element attribute 504, font type 506, font style 508, font color 510, font size 512, and font effect 514.

Figure 6:
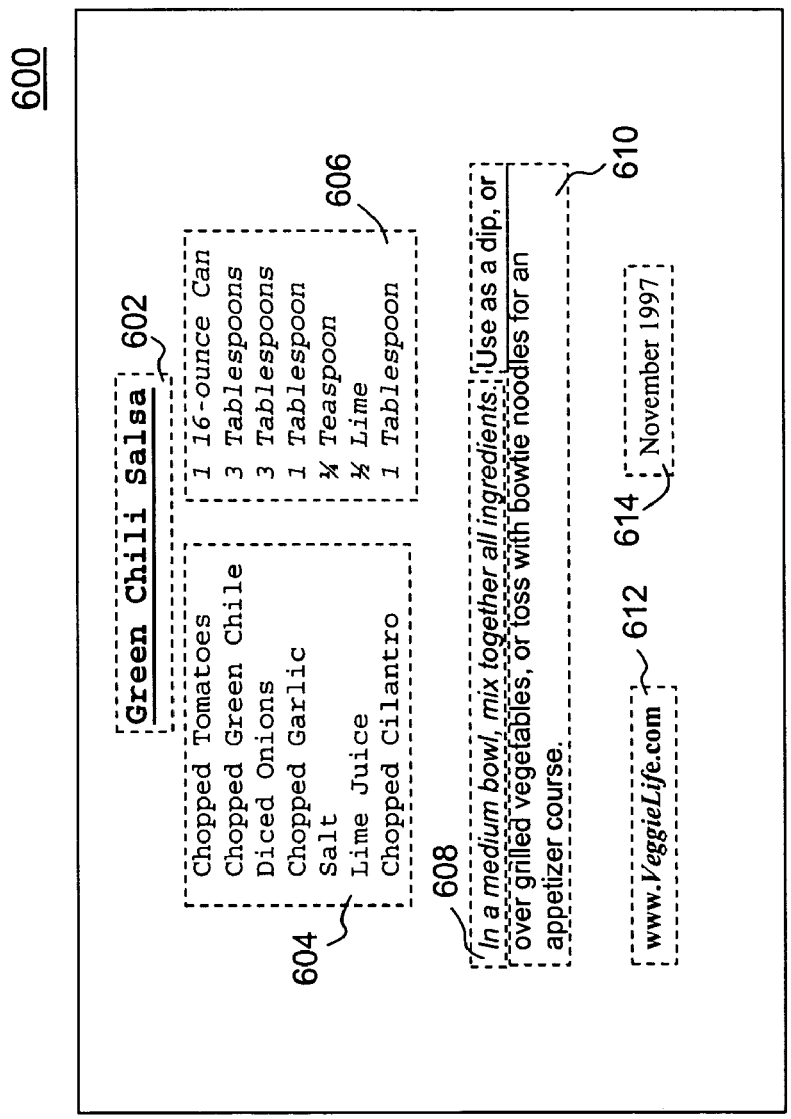
FIG. 6 shows an editing result for the unstructured document in FIG. 1, where each parsed data element has been assigned font attributes based on the association table in FIG. 5.

FIG. 6 shows an editing result 600 for the unstructured document 200 of FIG. 2A. Each parsed data element or combined objects 602, 604, 606, 608, 610, 612 and 614 have been assigned respectively font attributes based on the association table in FIG. 5 and displayed respectively in the associated font. During the parsing, this module allows sequence selections of data elements based on the reading order of the input document 602 to edit their font information. This module also allows region grouping of data elements to edit their font information. This module can also provide an auxiliary view of the association table.

Transformation or filtering module 414 converts the loaded documents into structured documents with user-defined document type definitions (DTD) using the structure-based font information. Mapping rules based on the document elements and font attributes for the conversion 416 is imported or designed in this module.

Figure 7:
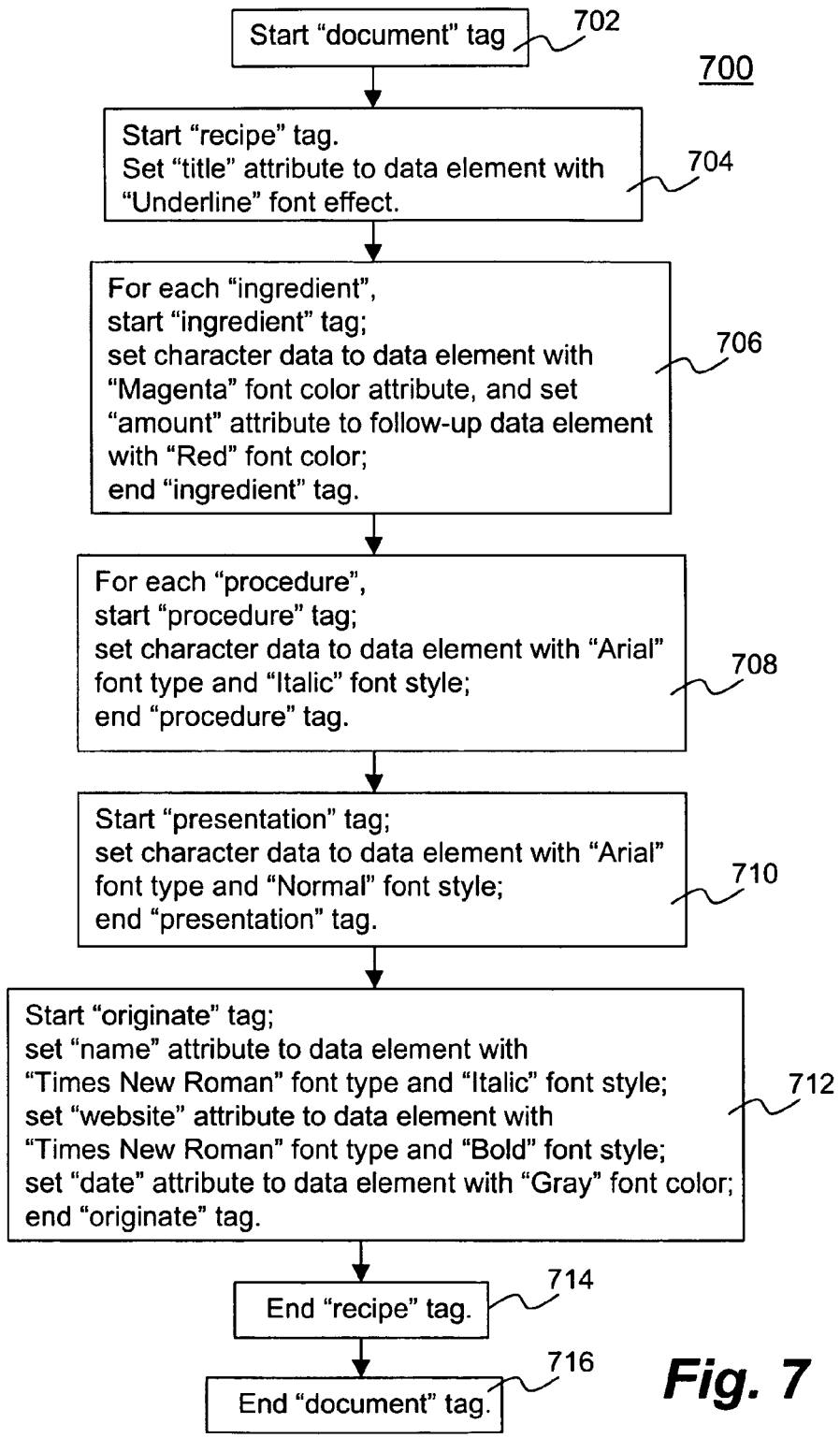
FIG. 7 shows a transformation process which converts the parsed data elements in FIG. 6 into the desired structured document with the exemplary DTD in FIG. 2B.

FIG. 7 illustrates an example 700 of the mapping rules for converting the edited document 602 into the structured document 220 of FIG. 2C. In particular, 702 starts and 718 ends the "document" element, 704 starts and 714 ends the "recipe" document, 706 forms the "ingredient" element, 708 forms the "procedure" element, 710 forms the "presentation" element, and 712 forms the "originate" element. In 704, 706, 708, 710, and 712, the structure-based font information is used to locate the data elements and the located data elements are assigned as attributes or parsed character data for document elements. These mapping rules can be implemented, by not restricted to, programming languages such as Java, JavaScript, extensible style language for transformation (XSLT), C/C++, . . . etc, or any build-in or programmable hardware devices. The converted documents can be either saved as a file document or exported into a document database 418.

Other than directly converting into the desired documents, the transformation module can also output the edited documents as the intermediate structured documents which contain the structure-based font information. The intermediate structured documents can be reloaded for further editing or batch conversion.

An example of the intermediate structured document 808 for the edited document 600 is given in FIG. 8, where 802 contains "font" elements with specific font attributes and 804 contains the parsed data elements with "font_ID" attributes to associate the font information. Since the parsed data elements with the same font attributes have been grouped by the same "font_ID" in the intermediate structured documents, mapping rules for conversion can be designed based on the grouped font information.

Figure 9:
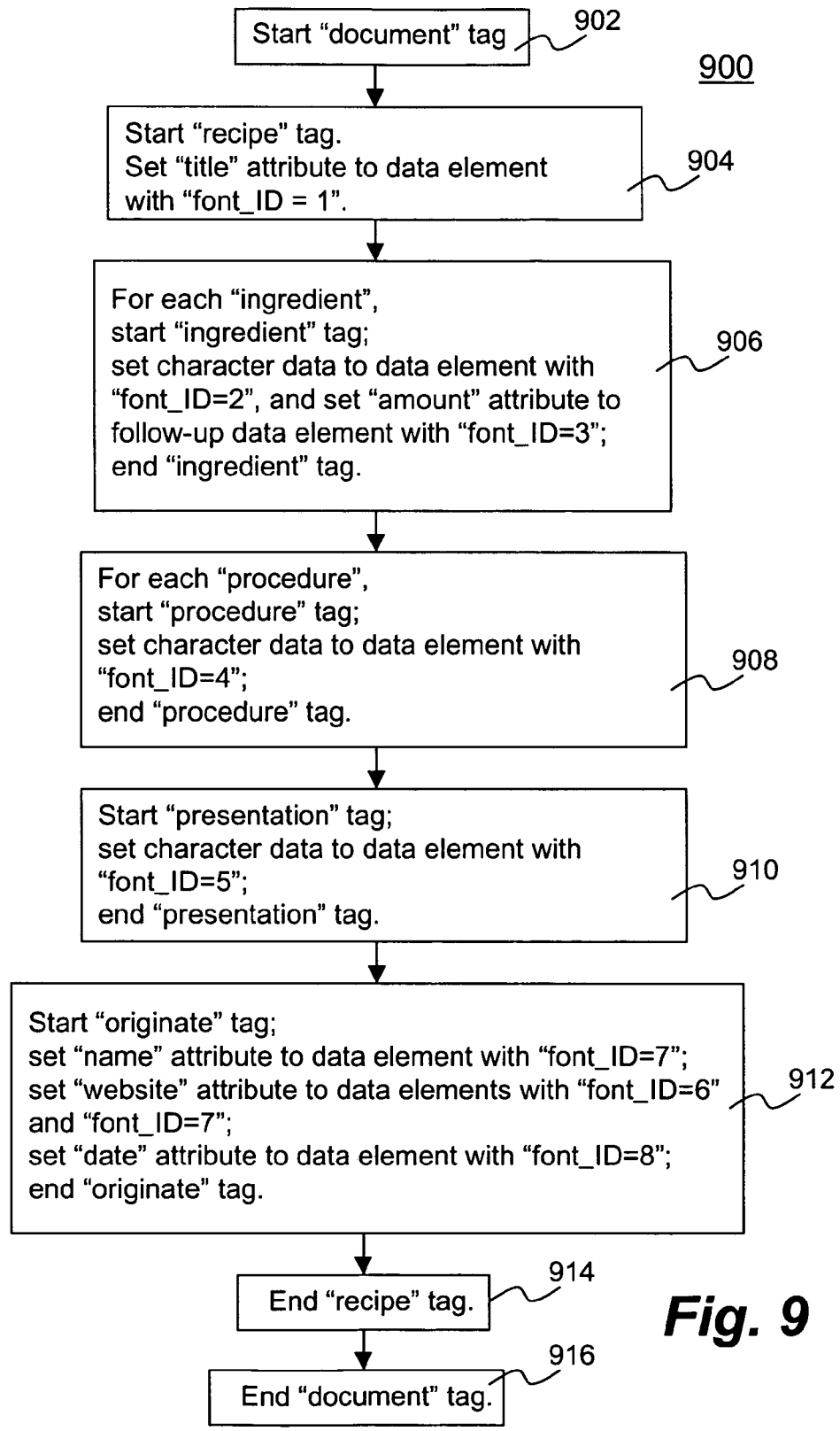
FIG. 9 shows a transformation process which converts the intermediate structured document in FIG. 6 into the desired structured document with DTD in FIG. 2.

FIG. 9 illustrates an example of the mapping rules for converting the intermediate document 800 into the structured document 220. In particular, 902 starts and 918 ends the "document" element, 904 starts and 914 ends the "recipe" document, 906 forms the "ingredient" element, 908 forms the "procedure" element, 910 forms the "presentation" element, and 912 forms the "originate" element. In 904, 906, 908, 910, and 912, the grouped font information is used to locate the data elements and the located data elements are assigned as attributes or parsed character data for document elements.

FIG. 10 shows an example of implementing the mapping rules given in FIG. 9 using the extensible style language for transformation (XSLT).

The invention described above is preferably implemented in software, hardware or a combination of both. At least portions of the invention can be embodied as computer readable code on a computer readable medium. The computer readable medium is any data storage device that can store data that can be thereafter read by a computing device. Examples of the computer readable medium include read-only memory, random-access memory, disk drives, floppy disks, CD-ROMs, DVDs, magnetic tape, optical data storage devices, carrier waves. The computer readable media can also be distributed over network coupled computer systems so that the computer readable code is stored and executed in a distributed fashion.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

The invention claimed is:

1. A method for producing a structured document, the method comprising:
converting an unstructured document into an output presentation in a first display, the output presentation including a number of displayable objects and respective decoration attributes about each of the displayable objects;
receiving a definition file including document type definitions (DTD) related to the unstructured document;
generating a tree structure in a second display showing hierarchical relationships of document elements from the DTD;
displaying in a second display next to the first display a DTD structure from the DTD showing structures of the document elements and the tree structure showing the hierarchical relationships of the document elements based on a root element;
associating one of the document elements in the tree structure with one of the displayable objects in the output presentation in the first display; and
generating a modified output presentation including association information of each one of the displayable objects being associated with one of the definitions in the definition file.

2. The method of claim 1, wherein
the modified output presentation further includes the displayable objects, each of the displayable objects being modified in accordance with the at least one of the definitions in the definition file.

3. The method of claim 2 further comprising:
converting the output presentation to a markup language file in accordance with a set of mapping rules.

4. The method of claim 1, wherein the definition file includes a structure for document elements, each corresponding to one of the displayable objects in the output presentation.

5. The method of claim 4, wherein some of the document elements include another layer of sub-document elements, each of sub-document elements corresponds to one of the displayable objects in the output presentation.

6. The method of claim 4, wherein at least some of the document elements include respectively a number of identifiers, each of the identifiers being assigned to one of the at least some of the document elements.

7. The method of claim 6, wherein some of the identifiers are one or more of numerals and alphabets.

8. The method of claim 6, wherein some of the identifiers are selected from a group consisting of a font type, a color name, a size, a style, and an effect.

9. The method of claim 6, wherein the associating of the at least one of the definitions in the definition file comprises:
selecting one of the displayable objects; and
assigning one of the identifiers to the selected display object.

10. The method of claim 1, wherein the output presentation is produced from an unstructured document that is composed, edited or managed by an authoring tool.

11. A method for producing a structured document, the method comprising:
activating an environment including a first display and a second display, the first display displaying an output presentation and the second display displaying a definition file including document type definitions (DTD), wherein the output presentation including a number of displayable objects being displayed and respective decoration attributes about each of the displayable objects, wherein each of the document type definitions includes an identifier;
forming a number of group objects, each of the group objects including one or more of the displayable objects; and
associating each of the group objects with the identifier in one of the document type definitions; and
creating the structured document from the output presentation in accordance with the at least one of the definitions being associated with the one of the displayable objects.

12. The method of claim 11 further comprising generating a modified output presentation including information of each of the group objects being associated with the identifier in one of the document type definitions.

13. The method of claim 12 further comprising:
converting the modified output presentation to a markup language file in accordance with mapping rules.

14. The method of claim 13 wherein the markup language file is suitable for presentation on a selected media.

15. The method of claim 11 wherein some of the decoration attributes include at least a position, a font type, a color, a size, a style, and an effect.

16. The method of claim 15, wherein the identifier is one or more of a numeral and an alphabet or one or more of (i) a font type, (ii) a color, (iii) a size, (iv) a style, and (v) an effect.

17. An apparatus for producing a structured document, the apparatus comprising:
a display screen;
a processor;
a memory, coupled to the processor, for storing code for an application, when the code is executed in the processor, the application performing operations of:
converting an unstructured document into an output presentation in a first display on the display screen, the output presentation including a number of displayable objects and respective decoration attributes about each of the displayable objects;

receiving a definition file including document type definitions (DTD) related to the unstructured document;

generating a tree structure in a second display showing hierarchical relationships of document elements from the DTD;

displaying in a second display next to the first display a DTD structure from the DTD showing structures of the document elements and the tree structure showing the hierarchical relationships of the document elements based on a root element;

associating one of the document elements in the tree structure with one of the displayable objects in the output presentation in the first display; and generating a modified output presentation including association information of each one of the displayable objects being associated with one of the definitions in the definition file.

18. The apparatus of claim 17, wherein the application further performs operation of generating a modified output presentation that includes the displayable objects, each of the displayable objects being modified in accordance with the at least one of the definitions in the definition file.

19. The apparatus of claim 17, wherein the application further performs operation of converting the output presentation to a markup language file in accordance with a set of mapping rules.

20. The apparatus of claim 17, wherein some of the decoration attributes include at least a position, a font type, a color, a size, a style, and an effect.

* * * * *